United States Patent [19]

Hensel

[11] 4,147,404
[45] Apr. 3, 1979

[54] DIELECTRIC OPTICAL WAVEGUIDE JOINTS

[75] Inventor: Paul C. Hensel, Woodbridge, England

[73] Assignee: The Post Office, London, England

[21] Appl. No.: 874,694

[22] Filed: Feb. 2, 1978

Related U.S. Application Data

[63] Continuation of Ser. No. 703,227, Jul. 7, 1976, abandoned.

[30] Foreign Application Priority Data

Aug. 14, 1975 [GB] United Kingdom ............... 33925/75

[51] Int. Cl.² .............................................. G02B 5/14
[52] U.S. Cl. ................................. 350/96.21; 29/630 F
[58] Field of Search ............... 350/96.21, 96.20, 96.22; 29/467, 630 A, 630 F; 156/158; 264/1, 248, 261

[56] References Cited

U.S. PATENT DOCUMENTS

| 3,699,651 | 10/1972 | Rueger et al. | 350/96.20 |
| 3,768,146 | 10/1973 | Braun et al. | 350/96.21 |
| 3,860,405 | 1/1975 | Coucoulas et al. | 350/96.21 |

OTHER PUBLICATIONS

Bell Sys. Tech. Jour. vol. 54, No. 2, Feb. 1975 pp. 451–455 by F. W. Dabby.

Primary Examiner—John K. Corbin
Assistant Examiner—Stewart Levy
Attorney, Agent, or Firm—Kemon & Estabrook

[57] ABSTRACT

A dielectric optical waveguide joint in which first and second dielectric optical waveguides are located end to end in a groove in a plate of non-ductile material. The dielectric optical waveguides are retained in the groove by a mass of ductile material which has been formed so as to flow into intimate contact with the plate and the first and second waveguides. The invention also provides a method of forming a waveguide joint.

8 Claims, 4 Drawing Figures

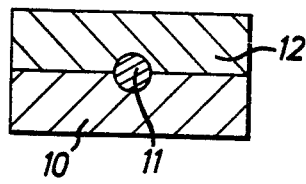
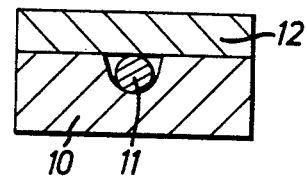
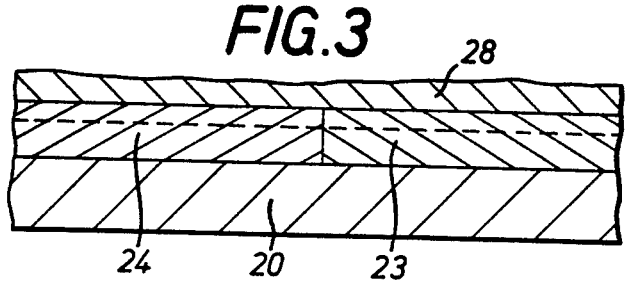
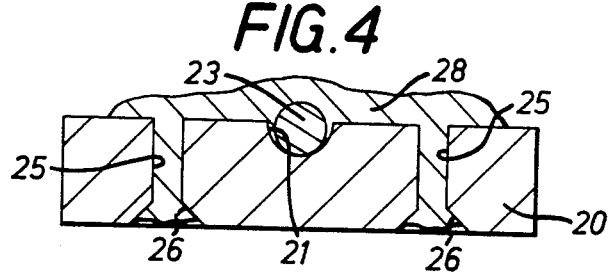

DIELECTRIC OPTICAL WAVEGUIDE JOINTS

This is a continuation, of application Ser. No. 703,227, filed July 7, 1976 now abandoned.

The present invention relates to the jointing of dielectric optical waveguides.

In a known method of joining two dielectric optical waveguides, a groove is formed in a perspex plate by pressing a dielectric optical waveguide into the plate, two dielectric optical waveguides are then slid along the groove until their ends abut, and a second plate is clamped on top of the dielectric optical waveguides to complete the joint. Joints made by this technique are frequently bulky and require the use of adhesive or clamps to complete the joint.

The present invention seeks to provide a groove plate joint which is simple, readily made, and compact. The joint of this type has clear advantages for implementation in the field.

According to a first aspect of the present invention there is provided a dielectric optical waveguide joint comprising a groove disposed on a first face of a plate of a non-ductile material, first and second dielectric optical waveguides located in said groove with their ends abutting, said first and second dielectric optical waveguides being retained in said groove by a mass of ductile material which has been formed so as to flow into intimate contact with said plate and said first and second dielectric optical waveguides.

Preferably said plate has at least one hole passing therethrough from said first face to a second face, the hole being wider at said second face than said first face, said mass of ductile material extending through said hole. Said ductile material may be pure tin, or indium, or a material having like mechanical properties.

According to a second aspect of the present invention there is provided a method of joining a first and a second dielectric optical waveguide comprising positioning said first and second dielectric optical waveguides so that an end face of said first dielectric optical waveguide abuts an end face of said second dielectric optical waveguide in a groove formed on a face of a non-ductile plate, placing a mass of ductile material on said face of said non-ductile plate and deforming said mass of ductile material so that it flows into intimate contact with said first and second dielectric optical waveguides and said face of said non-ductile plate and attaches to said non-ductile plate.

The invention will be described now by way of example only with particular reference to the accompanying drawings. In the drawings:

FIG. 1 shows a section through a dielectric optical waveguide joint of known type;

FIG. 2 shows a section through a dielectric optical waveguide joint of known type;

FIG. 3 shows a longitudinal section through a dielectric optical waveguide joint according to the present invention, and FIG. 4 shows a transverse section through a dielectric optical waveguide joint according to the present invention.

FIGS. 1 and 2 show two forms of dielectric optical waveguide joint which are produced by a known method of jointing. In this method a groove is formed in a perspex plate 10 by pressing a dielectric optical waveguide into the plate. Two dielectric optical waveguides 11 are then slid along the groove until their ends abut, and a second plate 12 is clamped on top of the dielectric optical waveguides to complete the joint.

Referring now to FIGS. 3 and 4 the initial stage in making a dielectric optical waveguide joint according to the invention is to form a groove 21 in a sheet 20 of non-ductile material such as plastics, copper, or anything that can be grooved, embossed etc. The term non-ductile is to be understood in a relative sense, i.e. as referring to a material which does not flow under pressure easily so that it is capable of offering at least some resistance to pressure.

The ends of two dielectric optical waveguides are then prepared by for example breaking using the fibre breaking device described in our co-pending application No. 29511/75. This produces plain end surfaces normal to the axis of the dielectric optical waveguides. The dielectric optical waveguides 23, 24 are then placed in the groove 21 on the top face of the plate 20 and slid along the groove until the two ends abut. The plate 20 is also provided with a set of four holes 25 each having a counter sunk end 26 on the opposite face of the plate to the groove. A mass of ductile material 28, e.g. indium or pure tin is then placed over the top of the joint between the two fibres and compressed. This forces the ductile material into intimate contact with the top surface of the plate 20, and the dielectric optical waveguides 23, 24. In addition ductile material is forced through the holes 25 and flows outwardly to fill in the counter sunk areas 26. This serves to retain the ductile material in position on the top surface of the plate when the pressure is removed from the mass of ductile material.

The best joint results are obtained if the pressure applying tool is slightly dished in the middle so that the pressure applied to the ductile material immediately over the junction between the two dielectric optical waveguides is somewhat lower than the pressure farther out along the dielectric optical waveguides. This has the effect, that the flow of ductile material tends to push the two dielectric optical waveguides being joined together thus ensuring good optical contact.

I claim:

1. A dielectric optical wave-guide joint comprising:
   a plate of non-ductile material having a groove disposed on a first face thereof and at least one cavity in said plate opening through said first face and having at least a portion which is undercut with respect to said face;
   first and second dielectric optical wave-guides located in said groove in axial alignment and with their ends abutting;
   a mass of ductile material which has been simultaneously pressure-formed into intimate contact with said wave-guides and into rigid attachment with said plate filling said cavity, said mass being the sole means for retaining said wave-guides in axially aligned abutting relationship and in said groove.

2. A dielectric optical wave-guide joint as defined by claim 1, wherein said cavity is a hole passing through said plate from said face to a second face, said hole being wider at said second face then said first face.

3. A dielectric optical waveguide joint as claimed in claim 1, wherein said ductile material is pure tin.

4. A dielectric optical waveguide joint as claimed in claim 1, wherein said ductile material is indium.

5. A method of joining two dielectric optical waveguides comprising:

providing a non-ductile plate with a groove on one face thereof and at least one cavity opening through said face and having a portion which is undercut with respect to said face;

positioning two dielectric optical wave-guides in said groove in axially aligned abutting relation;

placing a mass of ductile material on said face of said plate over-lying said wave-guides; and deforming said mass by pressure into intimate contact with said wave-guides and into rigid attachment with said plate filling said cavity.

6. A method as defined by claim 5 in which said cavity extends completely through said plate and is wider at the other face than at said one face.

7. A method as claimed in claim 5, wherein said ductile material is pure tin.

8. A method as claimed in claim 5, wherein said ductile material is indium.

* * * * *